United States Patent [19]

Bockelmann

[11] 3,726,500

[45] Apr. 10, 1973

[54] LOAD-CONTROLLED DISREEFING MECHANISM FOR PARACHUTES

[75] Inventor: Victor G. Bockelmann, El Centro, Calif.

[73] Assignee: The United States of America as represented by the Secretary of the Navy

[22] Filed: Aug. 23, 1971

[21] Appl. No.: 173,760

[52] U.S. Cl. ................................................244/152
[51] Int. Cl. .........................B64d 17/34, B64d 17/36
[58] Field of Search............................244/142, 152; 188/65.1, 65.4, 65.5

[56] References Cited

UNITED STATES PATENTS

| | | | |
|---|---|---|---|
| 2,626,117 | 1/1953 | Heinrich | 244/152 |
| 3,173,636 | 3/1965 | Sepp, Jr. | 244/145 |
| 3,429,532 | 2/1969 | Sepp | 244/145 X |
| 3,470,982 | 10/1969 | Warden, Jr. | 188/65.5 X |
| 3,412,963 | 11/1968 | Struble, Jr. | 244/146 |

Primary Examiner—Milton Buehler
Assistant Examiner—Carl A. Rutledge
Attorney—R. S. Sciascia

[57] ABSTRACT

A device is provided for regulating continuously the growth rate of the diameter of parachute canopy skirt during initial inflation for the purpose of controlling drag area, drag force and opening shock. The varying degree of disreefing is accomplished automatically when the force on the parachute is below a maximum determined level enabling the parachute to be inflated safely in a minimum elapsed time.

5 Claims, 4 Drawing Figures

PATENTED APR 10 1973  3,726,500

INVENTOR.
VICTOR G. BOCKELMANN
BY
George J. Rubens

LOAD-CONTROLLED DISREEFING MECHANISM FOR PARACHUTES

BACKGROUND

This invention relates to equipment for parachutes designed primarily for controlling continuously the disreefing of the canopy thereof, but it is to be understood that it can be used for any purpose for which it is found applicable.

It is a well established procedure on non-personnel type parachutes in the Armed Forces to use a reefing line to restrict the diameter of the skirt opening of the parachute canopy to prevent the opening forces during inflation from exceeding an established design level thereby to avoid destruction of the canopy, suspension system and/or to the load connection.

The prior-art reefing line is of a fixed length being strung along the skirt periphery. The reefing line of necessity is shorter than the skirt periphery to restrict the size of the skirt opening during initial inflation. The reefing line is in series with one or more commercially available circumferentially spaced cutters, usual of a pyrotechnic design in which the time delay is achieved by a cartridge employing a slow burning powder train. As the reefing technique is used to keep the forces on the parachute system from exceeding an established design level, the reefed canopy diameter and time are calculated for the most severe operating conditions, usually for the highest velocity and the maximum load. Therefore, the reefed time became a major factor in determining the amount of altitude required for successful parachute deployment. Accordingly, the low velocity, minimum load condition is penalized by the set reefing time delay. Since it is unlikely that all of the reefing cutters will act simultaneously, the variations in their time delays degrade the overall system in that additional altitude must be allocated to cover such contingency.

While the prior-art reefing line cutters have demonstrated a high degree of reliability, there are always two or three cutters used in each system. On some parachutes more than one reefed stage is used, the first reefed stage being the smallest diameter which is held to the restricted stage for a preset period of time, followed by a second reefed stage that has a larger diameter, etc., up to as many as four stages of reefing. For a heavy load delivery, a cluster of up to eight reefing parachutes may be employed, and the cost for single, non-reusable cutters to satisfy this requirement may involve a total well over a thousand dollars for each parachute system. In addition, non-uniform inflation, or early inflation of one of the canopies could overstress that canopy and cause its failure.

SUMMARY OF THE INVENTION

A reusable disreefing device is devised for non-personnel type parachute in which the load condition on the parachute controls the disreefing operation. This is accomplished by determining the initial reefed diameter for the continuous disreefing device for the highest velocity and maximum load condition, in a manner similar to the conventional reefing system heretofore described. However, if the velocity or load condition on the parachute is below the predetermined maximum value, the total force developed will not be utilized to brake the disreefing device and the reefed diameter will be allowed to increase gradually until the force exceeds the maximum, in which instance braking occurs to stop the disreefing operation. The interruption of the disreefing will normally last for only a short interval of time as the force decays rapidly. The disreefing operation may be interrupted many times before full inflation is achieved, but the inflation time will be a minimum for the designed force level under any set of launch conditions.

Each disreefing mechanism comprises generally a brake device and a pair of stowage compartments. In the illustrated embodiment, two disreefing mechanisms are employed with each canopy, each disposed 180° apart along the canopy skirt. Two pieces of reefing lines are utilized; the four bitter ends of which are housed within their respective stowage compartments with the intermediate adjacent sections of the lines being threaded through their associated brake mechanism. All of the reefing line ends are free to completely run out of their respective stowage compartments when allowed by the brake device. The brake device includes a pair of brake levers which are maintained in an inactive condition by a spring, preloaded to a predetermined force. The brake levers are connected to the main suspension lines so that when the tension of the lines exceeds the allowed maximum, the brake levers are operated against the spring action to snub the paying out of the reefing line and for the time being prevent further disreefing until the maximum force condition is relieved.

STATEMENT OF THE OBJECTS OF INVENTION

A principal purpose of this invention is to provide a parachute disreefing mechanism that is controlled by the amount of load on the parachute, rather than at a predetermined fixed period of time, to provide a more positive and continuous reefing control.

Another important purpose of the invention is to provide a disreefing mechanism capable of continuously disreefing a parachute canopy to enable a minimum inflation time for the designed force level under any set of launch conditions.

Still a further important object is to provide a disreefing mechanism with a high degree of reliability to safe guard against a complete disreefing failure.

Still another object is to provide a disreefing mechanism that will ensure a more uniform inflation of one or more parachutes.

Other objects, advantages and novel features of the invention will become apparent from the following detailed description of the invention when considered in conjunction with the accompanying drawings.

DESCRIPTION OF THE PREFERRED EMBODIMENT

Figure 1:
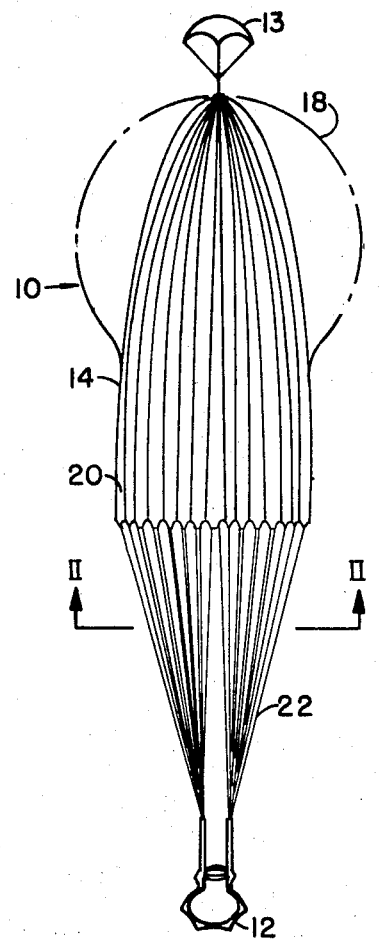
FIG. 1 is a parachute assembly supporting a load with the components of the parachute shown by solid lines in an initial stretch-out condition to the maximum allowed by the reefing line just prior to the canopy fully inflating to the reefed condition, shown in phantom lines.
Figure 2:
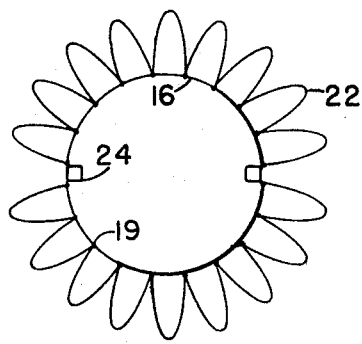
FIG. 2 is a cross-section view looking into the canopy skirt along line II—II.
Figure 3:
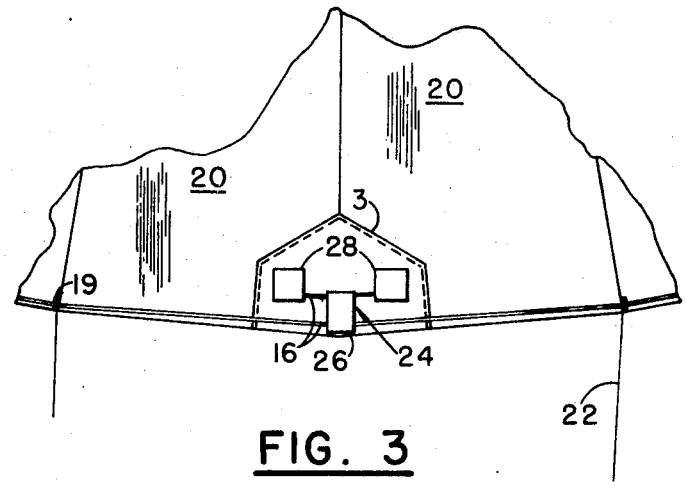
FIG. 3 is an enlarged partial elevational view taken inside the canopy of one of the disreefing devices.
Figure 4:
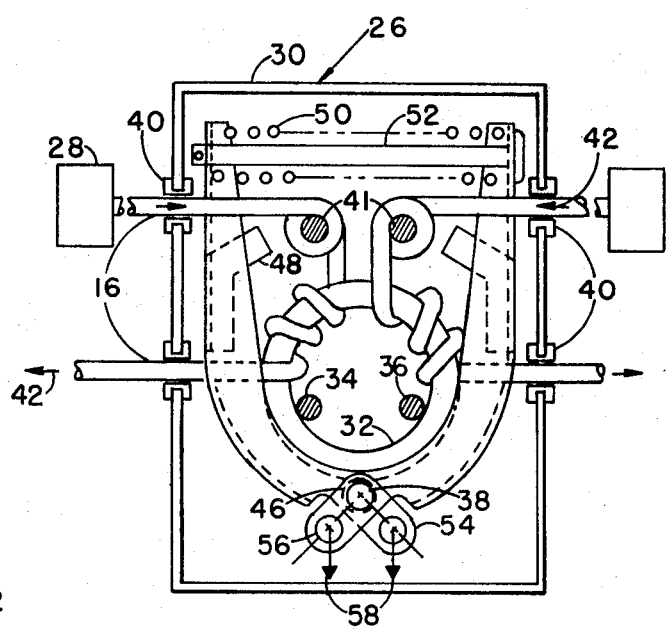
FIG. 4 is an enlarged view of the brake mechanism with the cover removed to show the details, the brake levers being in a non-braking position.

Referring to the drawing where like reference numerals refer to similar parts throughout the Figures, there is depicted in FIG. 1 a parachute assembly 10 supporting a load 12, illustrated as a torso dummy used for test drops. A conventional pilot chute 13 is shown attached to the canopy apex. The various components of the parachute components are shown in the stretch-out condition with the canopy skirt 14 inflated to the maximum allowed by the a reefing line 16 (FIGS. 2–4 inclusive) just prior to the canopy inflating to the reefed condition as shown by the phantom line 18. As seen in FIGS. 2 and 3 looking up into the canopy, reefing line 16 extends around the circumference thereof freely passing through reefing rings 19 installed on the skirt at the seam of adjacent gores 20 from which a conventional suspension line 22 extends downwardly to the load. As shown, the reefing line encircles the canopy skirt to reduce the diameter thereof, causing each canopy gore 20 to be doubled in a folded relationship.

The present invention is directed to a mechanism for controlling continuously the operation of the reefing line throughout canopy inflation. This is accomplished by utilizing one or more continuous disreefing mechanisms 24, the illustrated embodiment utilizing two such mechanisms mounted to the canopy hem in diametrical opposed disposition (FIG. 2), however it is to be understood that the number of such mechanisms employed is a matter of design.

Each disreefing mechanism comprises a brake device 26 and a pair of associated storage compartments 28 in which the reefing line 16 is stowed in a folded condition, and from which it is payed-out through brake device 26 in a manner to be described. It should be noted that when two disreefing mechanisms are employed, reefing line 28 is fabricated in two sections, each section extending one-half of the skirt circumference. It is an important feature that the bitter ends of each reefing line section stored within its respective storage compartment 16 not be anchored therein, that is, they should be free to completely run out at the end of the reefing operation to enhance the reliability against reefing failure.

It is in another important feature of the invention to provide that the paying-out of the reefing line sections be continuously controlled by the brake devices 26 throughout the reefing operation. Each brake device is enclosed in a generally rectangularly shaped compartment 30 (FIGS. 3 and 4) attached to a canopy reinforcement patch 31 located at the corner of adjacent canopy gores. Enclosed with the compartment is a floating ring 32 restrained by three pins 34, 36 and 38 transversely mounted between the walls of the compartment, pins 34 and 36 being located within the ring, and pin 38 located exterior the ring. The two sections of reefing line 16 enter the compartment from opposite side walls through respective grommetted openings 40. The upper leg of each reefing line section extends horizontally from the respective storage compartments and is wrapped 1 ¼ turns around a snubbing pin 41, then descends downwardly to be wrapped around the top of ring 32 for 2 ½ turns, departing ring 32 at its side approximately 90° from the initial wrap-on point. The reefing line projects horizontally back out of the compartment through the same side wall it entered and extends to encircle one-half of the canopy skirt, the line being threaded through reefing rings 19 at each gore seam. The paying-out path of each reefing line section is indicated by arrows 42. It is obvious that the number of wraps of the reefing line around ring 32 and snubbing pins 40, as well as the number of snubbing pins employed will depend on the diameter and material of the reefing line, as well as other factors.

The braking action is accomplished by a pair of identical brake levers 44 which are hinged adjacent their lower ends by means of a sleeve 46 on pin 38, jointly forming a U-shaped configuration. Each lever has a channel-shape cross-section having apertures through which the horizontal portions of the reefing line 16 freely pass through. The bottom end of floating ring 32 projects downwardly slightly into the lever channel to be laterally restrained thereby. Each lever is provided with a pressure pad 48 disposed in the channel at a location to be capable of engaging that looped portion of the reefing line around snubbing pin 41. Both brake levers are biased to an outward, non-braking position by a compression spring 50 which is confined between the upper ends of the brake levers and restrained in position by a coaxial stud 52 which restricts outward movement. The spring is designed with a predetermined preload to ensure that disreefing will occur under safe operating condition in a manner that will be explained.

The lower ends of brake levers 44 have the back of the channel cut away and the remaining side legs 54 are extended past pivot pin 38 and sleeve 46. The extended ends of legs 54 of each lever are joined together by a flat headed pin and spacer 56 from which points one of the suspension lines 22 is looped as shown by the arrows 58. Thus, the load on the suspension line 22 exerts a downward force on the bottom ends of the brake levers which through pivot 38 tends to move the upper ends of the brake levers toward each other to compress brake spring 50 and bring pads 48 to bear on the snubbed portion of the reefing line around pin 41.

The operation of the continuous disreefing mechanism commences after the parachute has been deployed in the conventional manner. Pilot chute 13 has extended the main chute, suspension lines 22, and load 12 to the stretch-out condition shown in FIG. 1, at which condition, if not before, the dynamic pressure inflates the canopy skirt to the restrained diameter through reefing line 16 (see FIG. 2). The canopy continues to inflate until it reaches the inverted pear shape 18 typical of reefed inflation. The initial reefed diameter for the continuous disreefing mechanism is determined for the highest velocity and maximum load, same as for the conventional reefing system. However, with the invention mechanism if the load on suspension lines 22 is less than the preloaded force in spring 50, the spring will maintain brake levers 44 in their spread-apart non-braking position, shown in FIG. 4, and the tension in the reefing line will cause each of its sections to unwind around floating ring 32 and their respective snubbing pin 41 in the direction of arrows 42—one reefing line section being payed-out to the left of the brake level and the other section to the right, as viewed in FIG. 4. Under this condition the reefed diameter of the skirt will continuously increase until the force on the suspension line 22 becomes greater than the preloaded spring force (times the mechanical ratio). This condition will cause the brake levers to be actuated pivotally toward each other compressing spring 50 and forcing each pressure pad 48 frictionally to engage the snubbed portion of the respective reefing line section around snubbing pins 41 to stop the feeding out of any additional line. This braked condition of the reefing line will prevail until the total load falls below the value at which the brake levers were actuated. The interruptions of the disreefing operation will last for only a short time interval as the force decays rapidly. In practice the disreefing operation may be interrupted many times before full inflation is achieved, however the total inflation time will be a minimum for the designed force level under any set of launch conditions.

Since the four bitter ends of the reefing lines section are not connected within their respective storage compartments, the ends are free to feed out completely from their compartments. The value of this arrangement is apparent in that to have a complete disreefing failure both reefing line sections would have to jam at all four locations. To have a partial disreefing failure, both ends of the same reefing line section would have to jam, thus, the jamming of only one end of any one of reefing line sections will not cause a failure, as the other end of the line is free to completely feed out of the disreefing mechanism ensuring a high reliability in the reefing operation.

I claim:

1. A disreefing mechanism for controlling the growth rate of a parachute having suspension lines and a canopy skirt opening comprising:
   a reefing line extending around the periphery of the canopy skirt and having free and unconnected ends;
   storage means for containing a supply of said reefing line;
   brake means for controlling the paying-out of both adjacent free ends of said reefing line from the storage means;
   means for actuating said brake means in accordance with a predetermined load condition exerted on the parachute.

2. The mechanism of claim 1 wherein a freely movable snubbing means is provided in the brake mechanism for snubbing the paying-out of the reefing line to provide a controlled rate of growth.

3. The mechanism of claim 2 wherein said snubbing means comprises a ring-like member about which each reefing line end is wrapped a predetermined number of turns.

4. The mechanism of claim 1 wherein said reefing line is composed of a plurality of separate sections; and
   a single brake means is provided for controlling the free ends of adjacent sections of reefing line.

5. The mechanism of claim 1 wherein said brake includes:
   a pair of hinged levers;
   compressible means connected between corresponding ends of said levers to provide a predetermined force to maintain said levers in a non-braking position;
   said levers being connected to the suspension lines for actuating said levers against the compressible means and apply a force frictionally to engage the reefing line.

* * * * *